US012113275B2

(12) United States Patent
Wu et al.

(10) Patent No.: US 12,113,275 B2
(45) Date of Patent: Oct. 8, 2024

(54) PRINTED ANTENNA

(71) Applicant: HUAWEI TECHNOLOGIES CO., LTD., Guangdong (CN)

(72) Inventors: Dongwei Wu, Wuhan (CN); Jinjin Shao, Wuhan (CN); Cao Shi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 17/846,215

(22) Filed: Jun. 22, 2022

(65) Prior Publication Data

US 2022/0320723 A1 Oct. 6, 2022

Related U.S. Application Data

(63) Continuation of application No. PCT/CN2020/116438, filed on Sep. 21, 2020.

(30) Foreign Application Priority Data

Dec. 23, 2019 (CN) ......................... 201911345171.7

(51) Int. Cl.
*H01Q 1/38* (2006.01)
*H01Q 7/00* (2006.01)
*H01Q 19/10* (2006.01)

(52) U.S. Cl.
CPC ................. *H01Q 1/38* (2013.01); *H01Q 7/00* (2013.01); *H01Q 19/10* (2013.01)

(58) Field of Classification Search
CPC ............ H01Q 1/38; H01Q 7/00; H01Q 19/10; H01Q 7/005; H01Q 15/14; H01Q 3/247; H01Q 1/50; H01Q 1/36
See application file for complete search history.

(56) References Cited

U.S. PATENT DOCUMENTS 8,854,273 B2 * 10/2014 Li ............................ H01Q 9/42 343/866
9,711,866 B1 7/2017 Doane et al.
(Continued)

FOREIGN PATENT DOCUMENTS

CN 1965445 A 5/2007
CN 103594778 A 2/2014
(Continued)

OTHER PUBLICATIONS

Yue Li et al., A Compact Hepta-Band Loop-Inverted F Recon gurable Antenna for Mobile Phone, IEEE Transactions on Antennas and Propagation, vol. 60, No. 1, Jan. 2012, 4 pages.
(Continued)

*Primary Examiner* — Hai V Tran
*Assistant Examiner* — Michael M Bouizza

(57) ABSTRACT

A printed antenna may include a loop antenna body, a feed port, and a switch component. The loop antenna body includes a first end and a second end, there is a spacing between the first end and the second end, a connection line between the first end and the second end forms a closed loop with the loop antenna body. The feed module is configured to output a feed signal to the loop antenna body by using the feed port. The loop antenna body includes a plurality of loop antenna branches, the switch component is disposed between every two adjacent loop antenna branches, and the switch component is configured to connect or disconnect the two adjacent loop antenna branches.

14 Claims, 12 Drawing Sheets

(56) References Cited

U.S. PATENT DOCUMENTS

| | | | | |
|---|---|---|---|---|
| 2007/0024514 | A1* | 2/2007 | Phillips | H01Q 9/42 343/741 |
| 2008/0174508 | A1* | 7/2008 | Iwai | H01Q 9/30 343/850 |
| 2008/0231526 | A1 | 9/2008 | Sato | |
| 2010/0277383 | A1* | 11/2010 | Autti | H01Q 5/335 343/749 |
| 2015/0309202 | A1 | 10/2015 | Heinz et al. | |
| 2016/0302081 | A1 | 10/2016 | Liu et al. | |

FOREIGN PATENT DOCUMENTS

| | | | |
|---|---|---|---|
| CN | 103794879 | A | 5/2014 |
| CN | 104347932 | A | 2/2015 |
| CN | 104716418 | A | 6/2015 |
| CN | 106450741 | A | 2/2017 |
| CN | 106684557 | A | 5/2017 |
| CN | 107369891 | A | 11/2017 |
| CN | 107482318 | A | 12/2017 |
| CN | 107611567 | A | 1/2018 |
| CN | 107768820 | A | 3/2018 |
| CN | 109728417 | A | 5/2019 |
| JP | H10224135 | A | 8/1998 |
| JP | 2001326514 | A | 11/2001 |
| JP | 2006054639 | A | 2/2006 |
| JP | 2006180225 | A | 7/2006 |
| JP | 2006186851 | A | 7/2006 |
| JP | 2017046078 | A | 3/2017 |
| WO | 2009028251 | A1 | 3/2009 |
| WO | 2013088650 | A1 | 6/2013 |
| WO | 2018121089 | A1 | 7/2018 |
| WO | 2019144810 | A1 | 8/2019 |

OTHER PUBLICATIONS

Office Action dated Jul. 4, 2022 issued for Chinese Application No. 202011416352.7 (10 pages).

Extended European Search Report dated Dec. 5, 2022 for European Application No. 20907500-1 (10 pages).

International Search Report dated Oct. 28, 2020 for International Application No. PCT/CN2020/116438 (9 pages).

Notice of Reasons for Rejection dated Aug. 15, 2023, issued for Japanese Application No. 2022-536894 (5 pages) and translation (6 pages).

Office Action issued in KR10-2022-7024300, dated Jul. 18, 2023 with English translation, 11 pages.

* cited by examiner

PRINTED ANTENNA

CROSS-REFERENCE TO RELATED APPLICATIONS

This application is a continuation of International Application No. PCT/CN2020/116438, filed on Sep. 21, 2020, which claims priority to Chinese Patent Application No. 201911345171.7, filed on Dec. 23, 2019. The disclosures of the aforementioned applications are hereby incorporated by reference in their entireties.

TECHNICAL FIELD

This disclosure relates to the field of antennas, and in particular, to a printed antenna.

BACKGROUND

Currently, increasingly more electronic devices need built-in antennas to transmit and receive signals, and the antennas are generally disposed on a printed circuit board (PCB). When transmitting, the antenna converts a high-frequency current of a transmitter into a spatial electromagnetic wave, and when receiving, the antenna converts an electromagnetic wave intercepted from space into a high-frequency current and sends the high-frequency current to a receiver.

There are many types of antennas, and different applications require different antennas. A loop antenna is a type of antenna commonly used in a low-power and short-range system. The antennas have different radiation modes such as a monopole antenna and an inverted-F antenna, and different radiation modes correspond to different operating frequencies. However, a single radiation mode of the loop antenna cannot achieve relatively high radiation efficiency in different frequency bands, resulting in a relatively small coverage area of an operating frequency of the loop antenna.

SUMMARY

Embodiments of this disclosure provide a printed antenna, to improve an operating frequency coverage area and a directivity pattern coverage area of the antenna.

According to a first aspect, an embodiment of this disclosure provides a printed antenna. The printed antenna is printed on a substrate, a feed module is further disposed on the substrate, and the printed antenna includes a loop antenna body, a feed port, and a switch component. The loop antenna body includes a first end and a second end, there is a spacing between the first end and the second end, a connection line between the first end and the second end forms a closed loop with the loop antenna body, the first end is connected to the feed module by using the feed port, and the second end is connected to a ground point (GND). The feed module is configured to output a feed signal to the loop antenna body by using the feed port. The loop antenna body includes a plurality of loop antenna branches, the switch component is disposed between every two adjacent loop antenna branches, and the switch component is configured to connect or disconnect the two adjacent loop antenna branches.

In this implementation, an operating frequency of the loop antenna changes in two different statuses in which the switch component is turned on or off. Therefore, a plurality of operating frequencies and directivity patterns may be covered by adjusting turn-on or turn-off of each switch component, thereby expanding an operating frequency and a directivity pattern coverage mode that can be selected by the antenna.

Optionally, in some possible implementations, each switch component is a 0-ohm resistor. If two ends of the 0-ohm resistor are respectively soldered to two adjacent antenna branches, it indicates that the 0-ohm resistor is in a turn-on state. If two ends of the 0-ohm resistor are not soldered to two adjacent antenna branches, or one end of the 0-ohm resistor is not soldered to one antenna branch, it indicates that the 0-ohm resistor is in a turn-off state.

In this implementation, compared with other types of switch components, the 0-ohm resistor has relatively low costs, and an original BOM on a PCB is minimally changed, so that a development cycle and maintenance costs of the printed antenna can be reduced as much as possible.

Optionally, in some possible implementations, a control module is further disposed on the substrate, and each switch component is a diode. Two ends of each diode are separately connected to a control module by using two bias power cables, and the two ends of the diode are respectively connected to two adjacent antenna branches. The control module controls a voltage drop of the diode to turn on or turn off the diode.

In this implementation, an advantage of using the diode instead of the 0-ohm resistor is that on-off of the diode may be controlled in real time by using the control module, without a need for a worker to change an on-off status by manually soldering the 0-ohm resistor. The operating frequency or a directivity pattern of the antenna may be switched more flexibly.

Optionally, in some possible implementations, the printed antenna further includes a first reflector antenna body, the first reflector antenna body is disposed on one side of the loop antenna body, and the first reflector antenna body is connected to the feed module. The first reflector antenna body includes two first reflector antenna branches, a switch component is disposed between the two first reflector antenna branches, and the switch component located between the two first reflector antenna branches is configured to connect or disconnect the two first reflector antenna branches.

In this implementation, the first reflector antenna body is specifically configured to reflect an electromagnetic wave. Therefore, the directivity pattern of the printed antenna may alternatively be adjusted by controlling the switch component between the two first reflector antenna branches, thereby enriching implementations of this solution.

Optionally, in some possible implementations, the printed antenna further includes a second reflector antenna body, the second reflector antenna body is disposed on the other side of the loop antenna body, and the second reflector antenna body is connected to the feed module. The second reflector antenna body includes two second reflector antenna branches, a switch component is disposed between the two second reflector antenna branches, and the switch component located between the two second reflector antenna branches is configured to connect or disconnect the two second reflector antenna branches.

In this implementation, reflector antenna bodies may be disposed on both sides of the loop antenna body, thereby improving scalability of this solution.

Optionally, in some possible implementations, a switch component is disposed between the second end and the GND, and the switch component located between the second end and the GND is configured to connect or disconnect the second end and the GND.

In this implementation, an operating frequency coverage area and a directivity pattern coverage area of the printed antenna may be further expanded by controlling on-off of the switch component between the second end and the GND.

Optionally, in some possible implementations, the printed antenna includes a first switch component, a second switch component, a third switch component, and a fourth switch component. The loop antenna body includes a first loop antenna branch, a second loop antenna branch, a third loop antenna branch, and a fourth loop antenna branch. One end of the first loop antenna branch is connected to the feed module by using the feed port, and the first switch component is disposed between the other end of the first loop antenna branch and the second loop antenna branch. The second switch component is disposed between the second loop antenna branch and the third loop antenna branch, the third switch component is disposed between the third loop antenna branch and one end of the fourth loop antenna branch, and the fourth switch component is disposed between the other end of the fourth loop antenna branch and the GND.

In this implementation, a structure in which the loop antenna body is divided into four loop antenna branches is described, thereby improving practicability of this solution.

Optionally, in some possible implementations, the first loop antenna branch is a monopole antenna having a single radiation mode, which provides a basis for dividing the loop antenna body, thereby improving feasibility of this solution.

Optionally, in some possible implementations, an operating frequency band of the printed antenna covers an operating frequency band (including 2.4 GHz and 5 GHz) of a wireless local area network (WLAN) standard and an operating frequency band (including 1.6 GHz to 2.2 GHz and 2.3 GHz to 2.7 GHz) of a long term evolution (LTE) standard. Radiation directions of the printed antenna include horizontal omnidirectional, horizontal directional, and vertical coverage.

In this implementation, a plurality of operating frequency bands and directivity patterns that can be covered by the printed antenna are listed, thereby further improving practicability of this solution.

It can be learned from the foregoing technical solutions that the embodiments of this disclosure have the following advantages:

In the embodiments of this disclosure, the loop antenna body includes a plurality of loop antenna branches, and the switch component is disposed between every two adjacent loop antenna branches. Each switch component may connect or disconnect two adjacent loop antenna branches. The operating frequency of the loop antenna changes in two different statuses in which the switch component is turned on or off. Therefore, a plurality of operating frequencies and directivity patterns may be covered by adjusting turn-on or turn-off of each switch component, thereby expanding the operating frequency and the directivity pattern coverage mode that can be selected by the antenna.

BRIEF DESCRIPTION OF DRAWINGS

FIG. 3(*b*) is a simulation diagram of an S11 parameter corresponding to a second on-off combination of switch components;

FIG. 3(*c*) is a directivity pattern corresponding to the first on-off combination of switch components;

FIG. 3(*d*) is a directivity pattern corresponding to the second on-off combination of switch components;

DESCRIPTION OF EMBODIMENTS

Embodiments of this disclosure provide a printed antenna, to expand an operating frequency and a directivity pattern coverage mode that can be selected by the antenna. In this specification, the claims, and the accompanying drawings of this disclosure, terms “first”, “second”, “third”, “fourth”, and the like (if existent) are intended to distinguish between similar objects but do not necessarily indicate a specific order or sequence. It should be understood that data termed in such a way is interchangeable in an appropriate circumstance, so that the embodiments described herein can be implemented in another order than the order illustrated or described herein. Moreover, terms “include”, “comprise”, and any other variants thereof mean to cover non-exclusive inclusion. For example, a process, method, system, product, or device that includes a list of steps or units is not necessarily limited to those steps or units, but may include other steps or units that are not expressly listed or inherent to such a process, method, product, or device.

Figure 1:
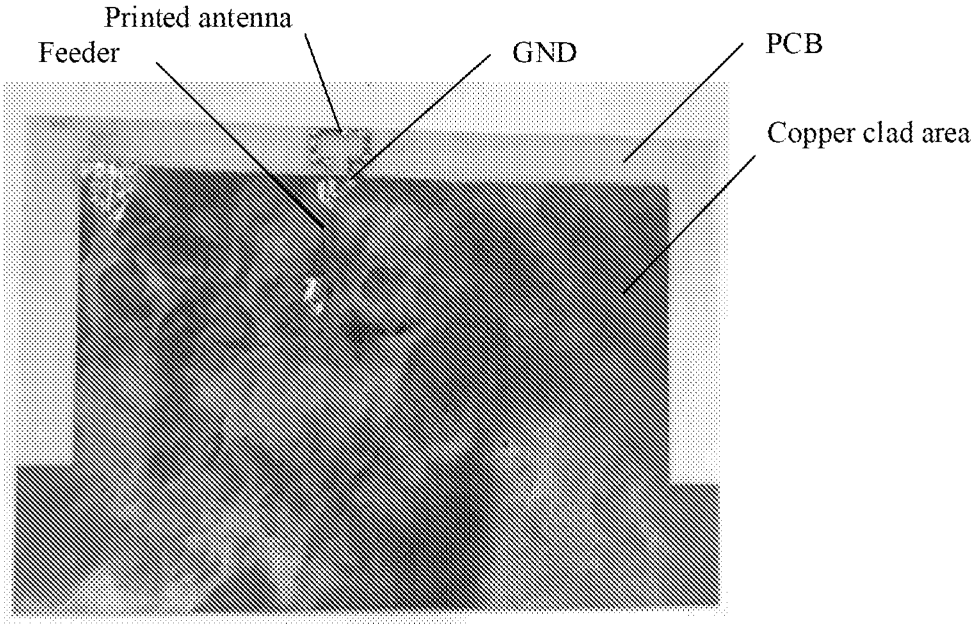
FIG. 1 is a physical diagram of a printed antenna.

FIG. 1 is a physical diagram of a printed antenna. As the name suggests, the printed antenna is an antenna obtained through printing. To reduce a volume of the antenna and reduce power consumption when ensuring transmission efficiency, the printed antenna may be designed on a printed circuit board (PCB), to meet a requirement of a portable wireless communications product with low power consumption. A copper clad area is disposed on the PCB, and the printed antenna is specifically disposed in an area outside the copper clad area on the PCB. One end of the printed antenna is connected to a feeder in the copper clad area to feed an electromagnetic wave signal, and the other end of the antenna is connected to a ground point (GND) in the copper clad area.

A type of the printed antenna is a loop antenna, and the loop antenna has advantages of a small volume, high reliability, and low costs, making the loop antenna an ideal antenna for a miniature communications product. However, a single radiation mode of the loop antenna cannot achieve relatively high radiation efficiency in different frequency bands, resulting in a relatively small coverage area of an operating frequency of the loop antenna.

Therefore, this disclosure provides a printed antenna, to improve an operating frequency coverage area and a directivity pattern coverage area of the antenna.

Figure 2:
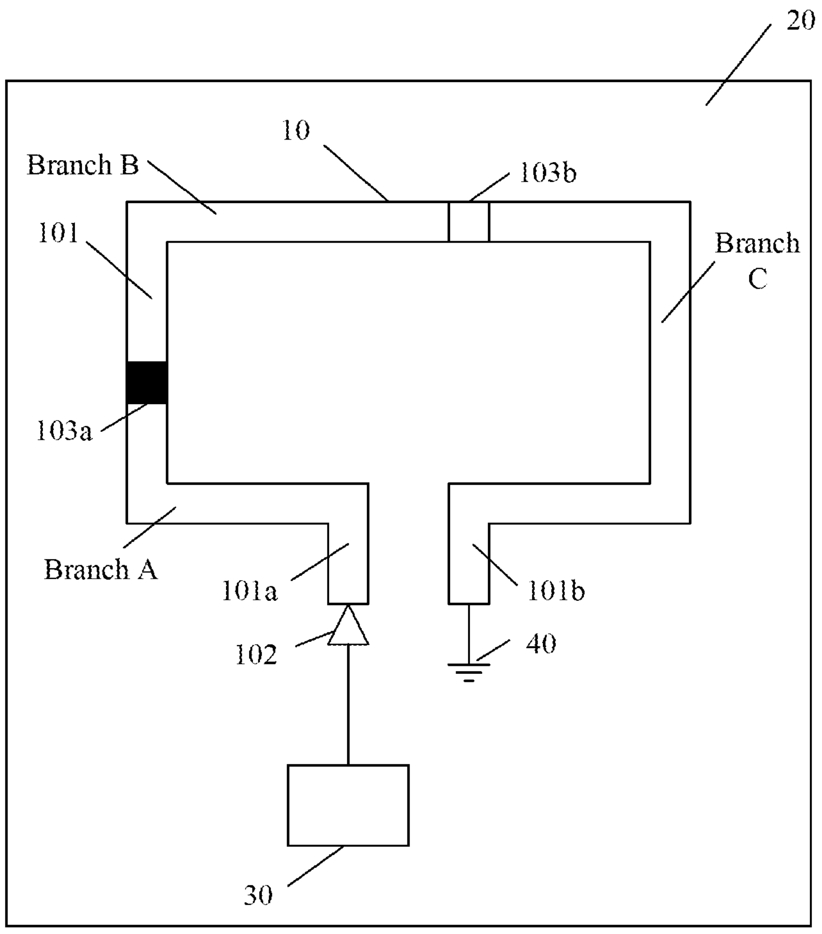
FIG. 2 is a schematic diagram of a structure of a printed antenna according to an embodiment of this disclosure.
Figure 3A:
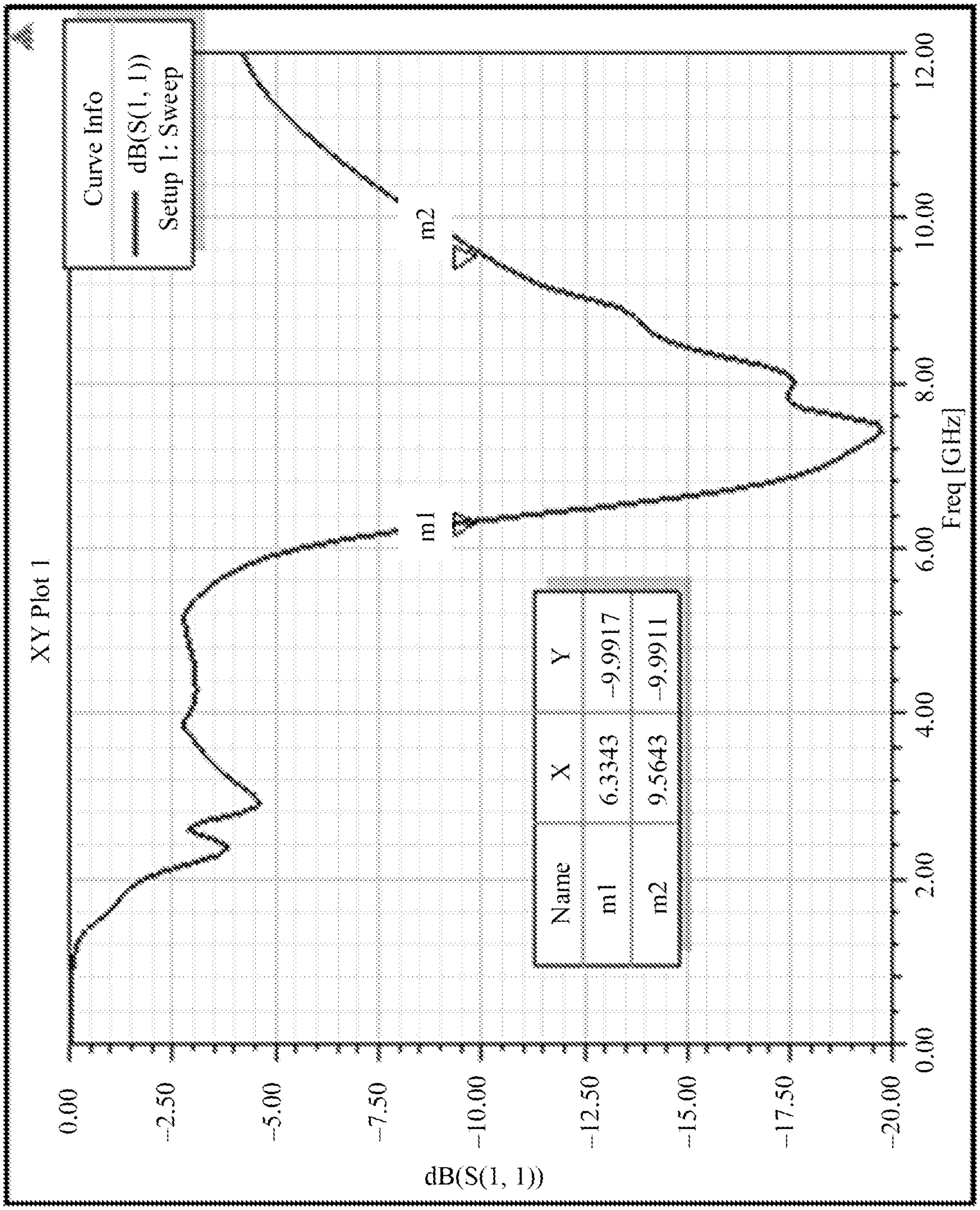
FIG. 3(*a*) is a simulation diagram of an S11 parameter corresponding to a first on-off combination of switch components.
Figure 3B:
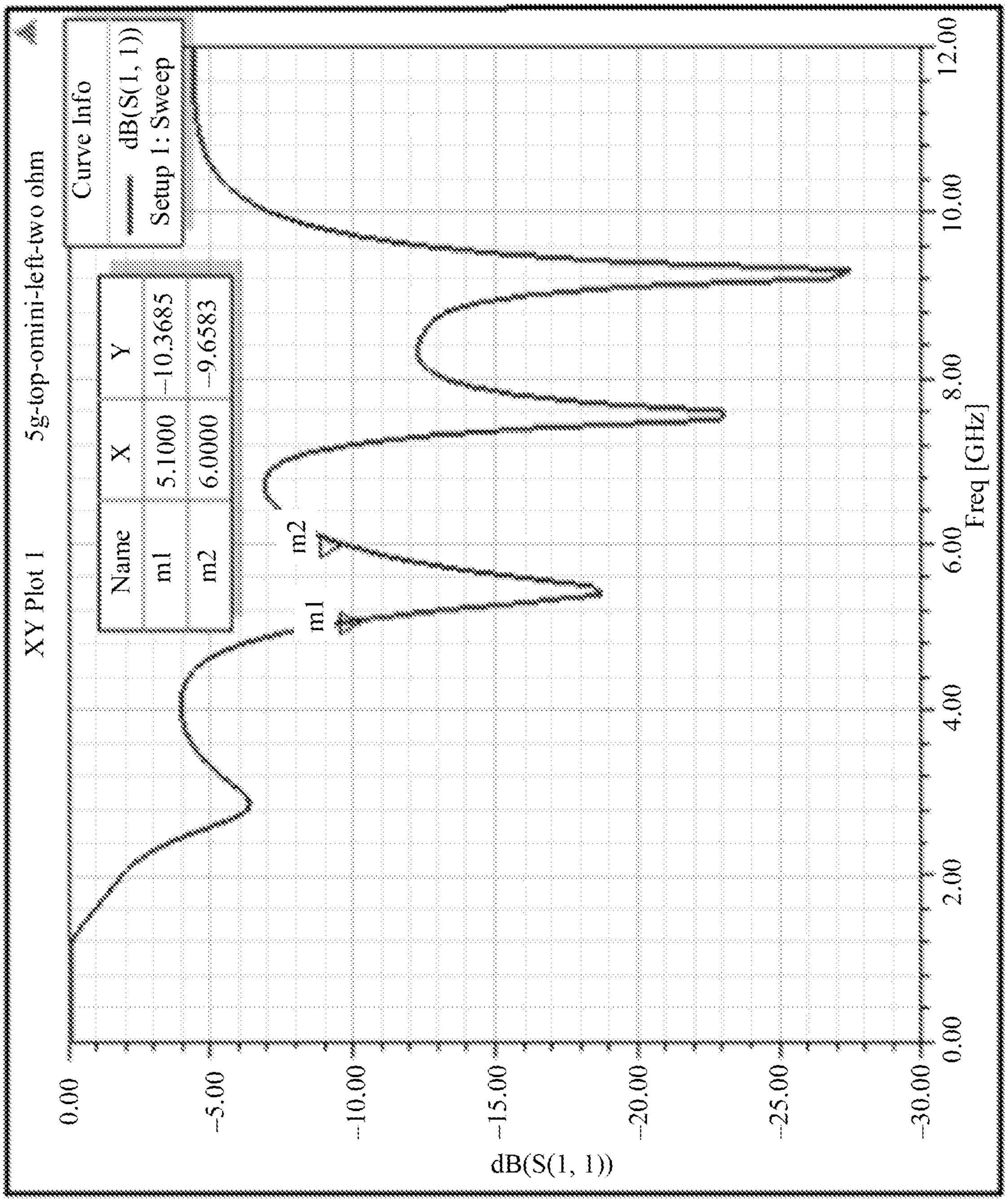
Figure 3C:
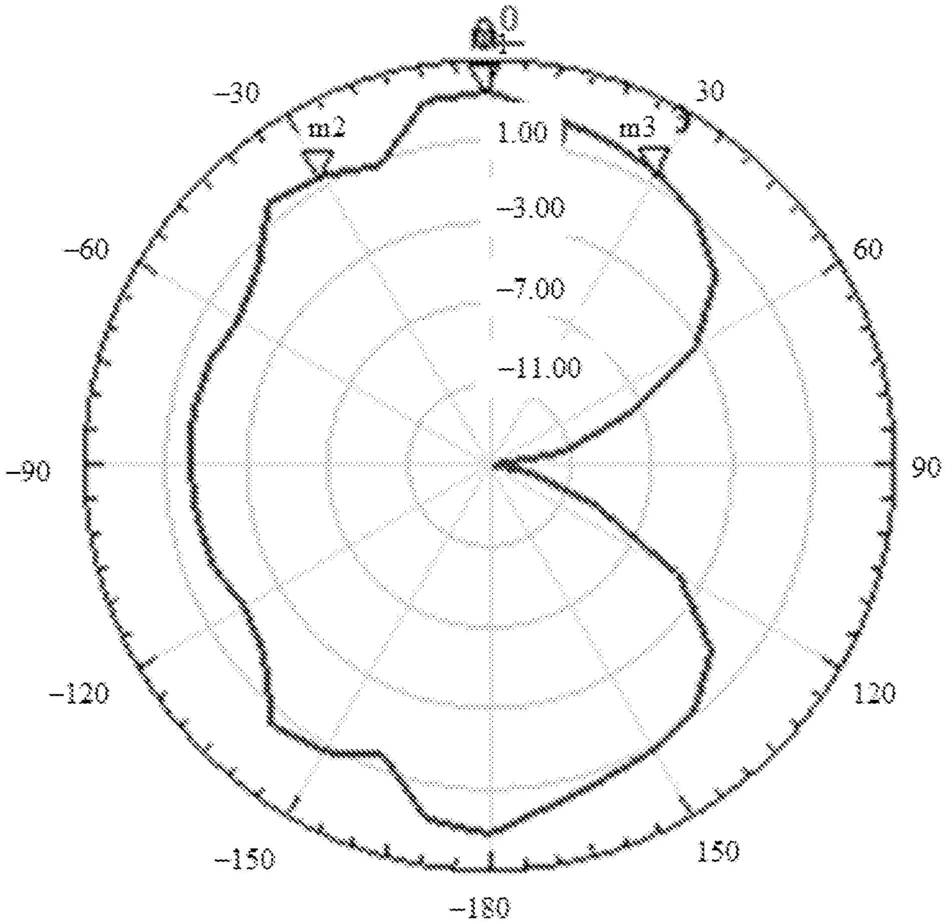
Figure 3D:
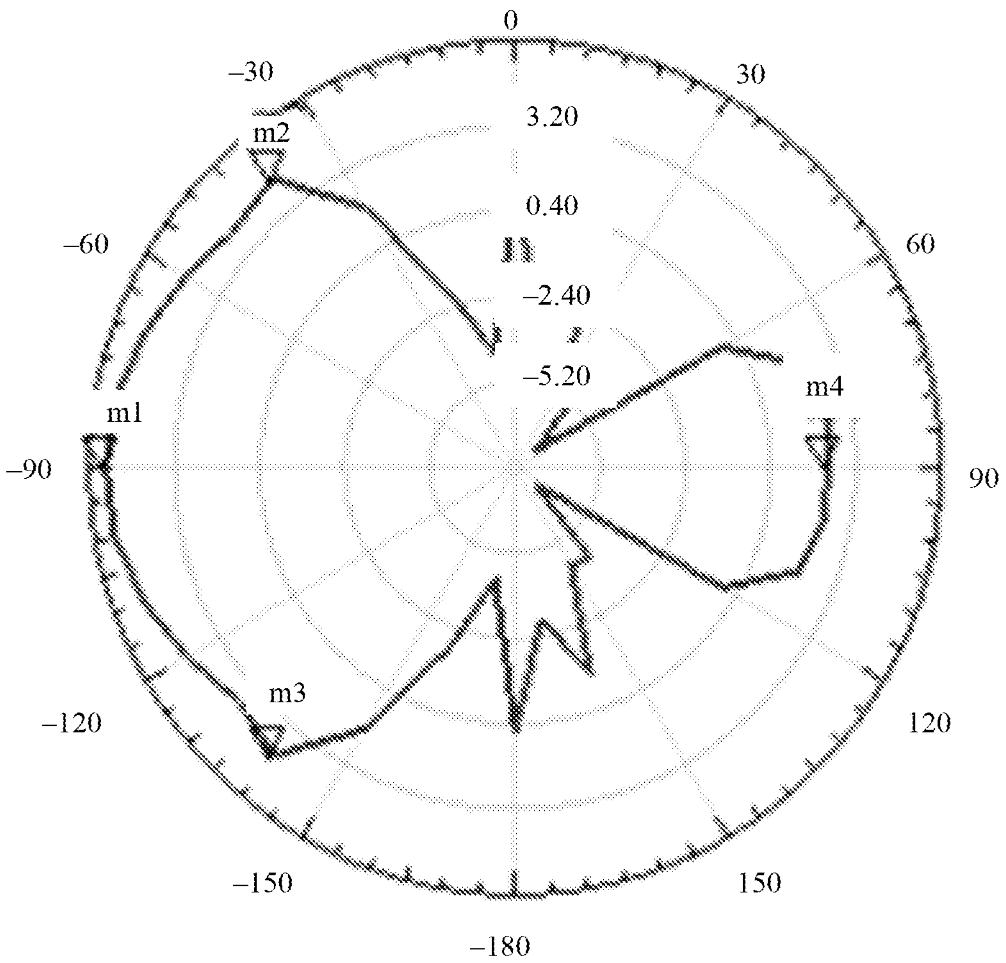

FIG. 2 is a schematic diagram of a structure of a printed antenna according to an embodiment of this disclosure. A printed antenna 10 is printed on a substrate 20. The printed antenna 10 includes a loop antenna body 101, a feed port 102, and at least one switch component 103 (including a switch component 103*a* and a switch component 103*b* that are shown in FIG. 2). The loop antenna body 101 includes a first end 101*a* and a second end 101*b*, and there is a spacing between the first end 101*a* and the second end 101*b*. A feed module 30 is further disposed on the substrate 20. The first end 101*a* is connected to the feed module 30 by using the feed port 102, and a feeder is connected between the feed port 102 and the feed module 30. The feed module 30 outputs a feed signal to the loop antenna body 101 by using the feed port 102, to supply power to the loop antenna body 101. The second end 101*b* is connected to a ground point (GND) 40 on the substrate 20, that is, the first end 101*a* and the second end 101*b* are also disconnected in a circuit.

The loop antenna body 101 may be formed by winding from the first end 101*a* (or the second end 101*b*) to the second end 101*b* (or the first end 101*a*), and a connection line between the first end 101*a* and the second end 101*b* may form a closed loop with the loop antenna body 101. Specifically, a shape of the loop may be a square loop shown in FIG. 2, or certainly may be a loop of another shape, such as a circular loop, a triangular loop, or a diamond loop. This is not limited herein.

The loop antenna body 101 includes a plurality of branches, and the switch component 103 is disposed between every two adjacent branches. For example, as shown in FIG. 2, a branch A is connected to the feed port 102, the switch component 103*a* is disposed between the branch A and a branch B, the switch component 103*b* is disposed between the branch B and a branch C, and the branch C is connected to the ground point 40.

Specifically, each switch component 103 is configured to connect or disconnect two adjacent branches. For example, as shown in FIG. 2, the switch component 103*a* connects the branch A and the branch B, and the switch component 103*b* disconnects the branch B and the branch C. It may be understood that each switch component 103 has two states: turn-on and turn-off, different states of switch components 103 may form a plurality of on-off combinations, and different combinations may also change an operating frequency and a directivity pattern of the printed antenna 10, thereby improving an operating frequency coverage area and a directivity pattern coverage area. The following provides a detailed description.

FIG. 3(*a*) is a simulation diagram of an S11 parameter corresponding to a first on-off combination of switch components. The S11 parameter indicates a return loss feature of the antenna. That is, the S11 parameter may be used to indicate whether transmit efficiency of the antenna is high. A smaller value of the S11 parameter indicates less energy reflected by the antenna and higher radiation efficiency of the antenna. Generally, if the S11 parameter is less than or equal to −10 dB, it indicates that the radiation efficiency of the antenna meets a requirement. In this case, a frequency range in which the S11 parameter is less than or equal to −10 dB may be determined as the operating frequency of the antenna. Specifically, FIG. 3(*a*) shows simulation performed under an on-off combination of switch components shown in FIG. 2. That is, the switch component 103*a* is turned on, and the switch component 103*b* is turned off. As shown in FIG. 3(*a*), a horizontal coordinate represents a frequency (unit: GHz), and a vertical coordinate represents an S11 parameter value (unit: dB). In this case, a frequency range corresponding to an S11 parameter less than or equal to −10 dB is 6.3 GHz to 9.5 GHz. That is, the operating frequency of the printed antenna shown in FIG. 2 is 6.3 GHz to 9.5 GHz.

FIG. 3(*b*) is a simulation diagram of an S11 parameter corresponding to a second on-off combination of switch components. Specifically, the on-off combination of switch components corresponding to FIG. 3(*b*) is that the switch component 103*a* is turned off and the switch component 103*b* is also turned off. It can be seen that in the on-off combination of switch components, the operating frequency of the printed antenna is 5.0 GHz to 6.0 GHz.

It should be noted that different on-off combinations of switch components may change the directivity pattern of the antenna, in addition to changing the operating frequency of the antenna. The directivity pattern is also referred to as a radiation directivity pattern. The directivity pattern is a pattern in which relative field strength (a normalized modulus value) of a radiation field changes with a direction at a specific distance from an antenna, and is usually represented by using two mutually vertical plane directivity patterns in a maximum radiation direction of the antenna. A directivity pattern mode may include horizontal omnidirectional, horizontal directional, and vertical coverage. The following provides a further description with reference to simulation results of the directivity pattern.

FIG. 3(*c*) is a directivity pattern corresponding to the first on-off combination of switch components. The on-off combination of switch components corresponding to FIG. 3(*c*) is consistent with the on-off combination of switch components corresponding to FIG. 3(*a*). That is, the switch component 103*a* is turned on, and the switch component 103*b* is turned off. It can be seen from FIG. 3(*c*) that the directivity pattern mode is vertical coverage.

FIG. 3(*d*) is a directivity pattern corresponding to the second on-off combination of switch components. The on-off combination of switch components corresponding to FIG. 3(*d*) is consistent with the on-off combination of switch components corresponding to FIG. 3(*b*). That is, the switch component 103*a* is turned off, and the switch component 103*b* is also turned off. It can be seen from FIG. 3(*d*) that the directivity pattern mode is horizontal left directional.

The printed antenna shown in FIG. 2 may specifically correspond to four different on-off combinations of switch components. The following uses Table 1 to list operating frequencies and directivity pattern modes of the antenna that are corresponding to various on-off combinations. For ease of description, in Table 1 below, "0" indicates that the switch component is turned off, and "1" indicates that the switch component is turned on.

| Switch Component 103a | Switch Component 103b | Directivity Pattern Mode | Operating Frequency/ GHz |
|---|---|---|---|
| 0 | 0 | Left directional | 5.0-6.0 |
| 0 | 1 | Vertical beam | 5.2-6.4 |
| 1 | 0 | Vertical beam | 6.3-9.5 |
| 1 | 1 | Vertical beam | 5.0-6.0 |

It should be noted that the switch component in this disclosure may specifically have a plurality of different types, which are separately described below.

Type 1: The switch component is a 0-ohm resistor. If the 0-ohm resistor is soldered to the antenna, the 0-ohm resistor is in a turn-on state. If the 0-ohm resistor is not soldered to the antenna, the 0-ohm resistor is in a turn-off state.

Figure 4:
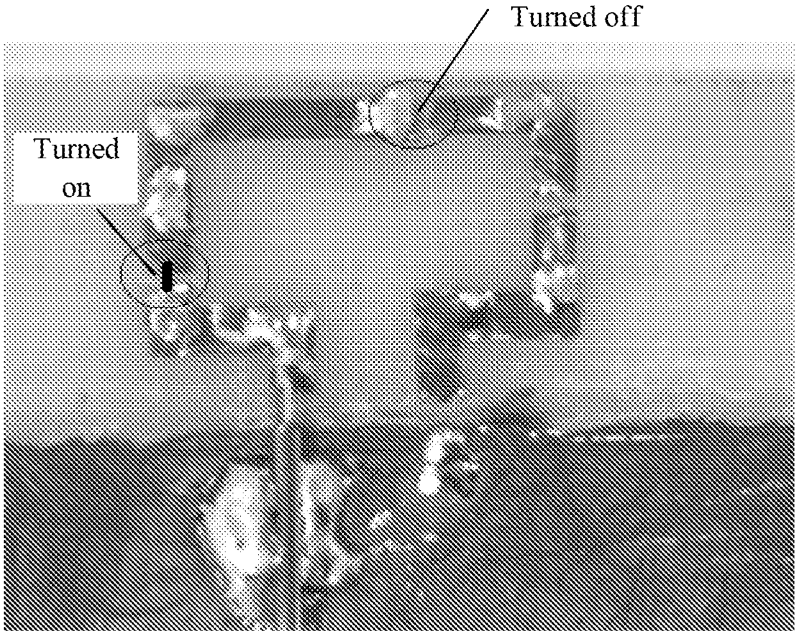
FIG. 4 is a physical diagram in which a 0-ohm resistor in a printed antenna is turned on or off.

FIG. 4 is a physical diagram in which a 0-ohm resistor in a printed antenna is turned on or off. It may be understood that if two ends of the 0-ohm resistor are respectively soldered to two adjacent antenna branches, it indicates that the 0-ohm resistor is in a turn-on state. If two ends of the 0-ohm resistor are not soldered to two adjacent antenna branches, or one end of the 0-ohm resistor is not soldered to one antenna branch, it indicates that the 0-ohm resistor is in a turn-off state.

It should be noted that, compared with other types of switch components, the 0-ohm resistor has relatively low costs, and an original BOM on a PCB is minimally changed, so that a development cycle and maintenance costs of the printed antenna can be reduced as much as possible.

Type 2: The switch component is a diode, and the diode is controlled to be turned on or off by using a control module.

Figure 5:
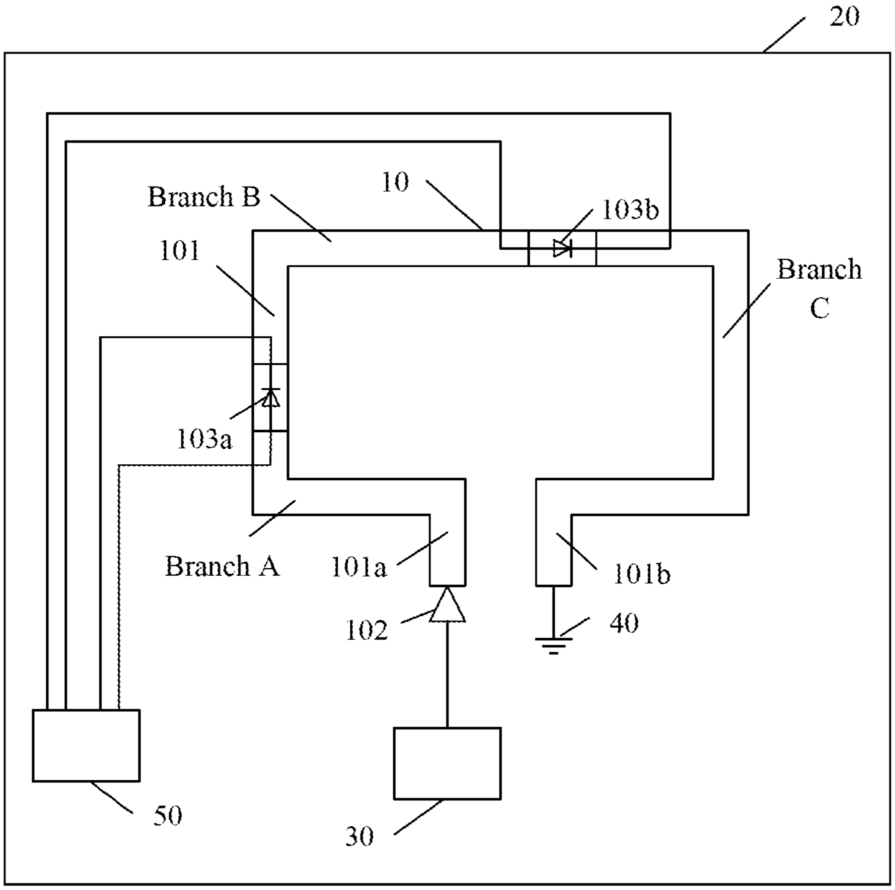
FIG. 5 is a schematic diagram of another structure of a printed antenna according to an embodiment of this disclosure.

FIG. 5 is a schematic diagram of another structure of a printed antenna according to an embodiment of this disclosure. A control module 50 is further disposed on the substrate 20. Two ends of the diode 103*a* are separately connected to the control module 50 by using two bias power cables, and the two ends of the diode 103*a* are respectively connected to two adjacent antenna branches. Two ends of the diode 103*b* are also separately connected to the control module 50 by using two bias power cables, and the two ends of the diode 103*b* are respectively connected to two adjacent antenna branches. The control module 50 controls voltage drops of the diode 103*a* and the diode 103*b* to turn on or turn off the diode 103*a* and the diode 103*b*.

It should be noted that, an advantage of using the diode instead of the 0-ohm resistor is that on-off of the diode may be controlled in real time by using the control module, without a need for a worker to change an on-off status by manually soldering the 0-ohm resistor. Switching of the operating frequency or the directivity pattern of the printed antenna is more flexible.

Optionally, in addition to the loop antenna body 101, the printed antenna 10 may further include at least one reflector antenna. The following provides a further description.

Figure 6:
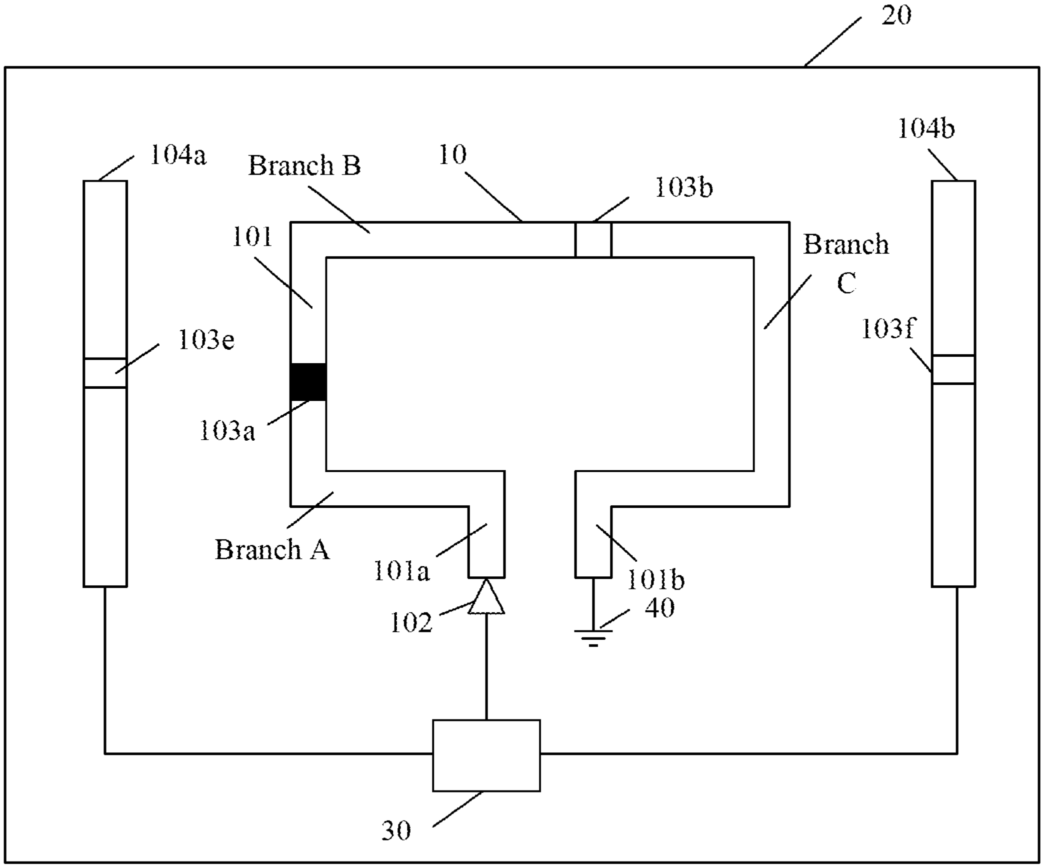
FIG. 6 is a schematic diagram of another structure of a printed antenna according to an embodiment of this disclosure.

FIG. 6 is a schematic diagram of another structure of a printed antenna according to an embodiment of this disclosure. Different from the printed antenna shown in FIG. 2, the printed antenna 10 further includes at least one reflector antenna 104 (a reflector antenna 104*a* and a reflector antenna 104*b* that are shown in FIG. 6) disposed on the substrate 20. As shown in FIG. 6, the reflector antennas 104 are specifically disposed on left and right sides of the loop antenna body 101. For example, the printed antenna 10 includes the reflector antenna 104*a* disposed on the left side of the loop antenna body 101, or the printed antenna 10 includes the reflector antenna 104*b* disposed on the right side of the loop antenna body 101, or the printed antenna 10 includes not only the reflector antenna 104*a* disposed on the left side of the loop antenna body 101, but also the reflector antenna 104*b* disposed on the right side of the loop antenna body 101. In addition, the reflector antenna 104*a* further includes two reflector antenna branches, a switch component 103*e* is disposed between the two reflector antenna branches, and the switch component 103*e* is configured to connect or disconnect the two reflector antenna branches. Similarly, the reflector antenna 104*b* also includes two reflector antenna branches, a switch component 103*f* is disposed between the two reflector antenna branches, and the switch component 103*f* is configured to connect or disconnect the two reflector antenna branches.

The reflector antenna 104*a* and the reflector antenna 104*b* are specifically configured to reflect an electromagnetic wave. Therefore, the directivity pattern mode of the printed antenna 10 may be adjusted by disposing the reflector antenna 104*a* and the reflector antenna 104*b* and controlling on-off of the switch component 103*e* and the switch component 103*f*. For example, an original directivity pattern mode of the printed antenna 10 is horizontal omnidirectional, and if the switch component 103*e* and the switch component 103*f* are both turned off, the directivity pattern mode of the printed antenna 10 is still horizontal omnidirectional. If the switch component 103*e* is turned on and the switch component 103*f* is turned off, the directivity pattern mode of the printed antenna 10 is right directional. If the switch component 103*e* is turned off and the switch component 103*f* is turned on, the directivity pattern mode of the printed antenna 10 is left directional.

It may be understood that the switch component 103*e* and the switch component 103*f* may be 0-ohm resistors, or may be diodes. This is not specifically limited herein.

Optionally, a switch component may also be disposed between the second end 101*b* of the loop antenna body 101 and the ground point 40. The following provides a further description.

Figure 7:
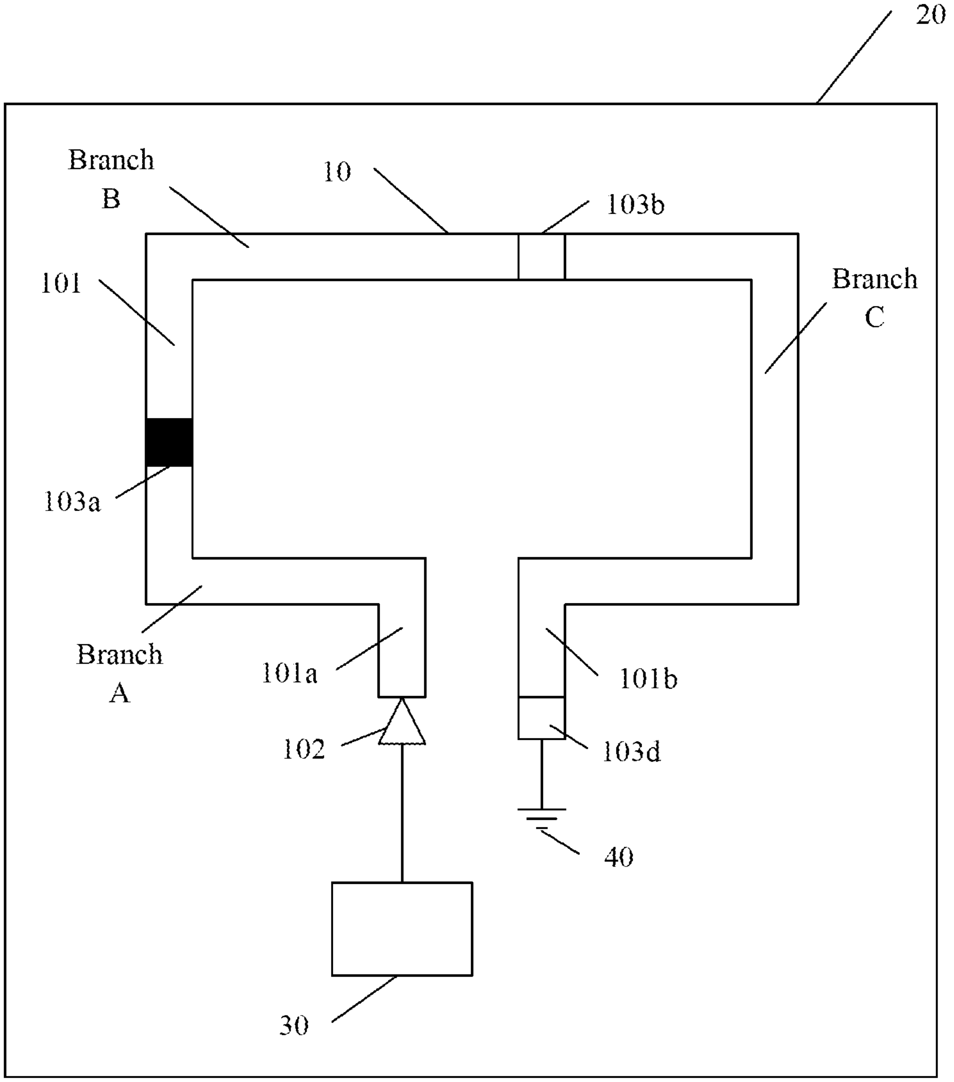
FIG. 7 is a schematic diagram of another structure of a printed antenna according to an embodiment of this disclosure.

FIG. 7 is a schematic diagram of another structure of a printed antenna according to an embodiment of this disclosure. Different from the printed antenna shown in FIG. 2, a switch component 103*d* may be further disposed between the second end 101*b* of the loop antenna body 101 and the ground point 40. The switch component 103*d* is configured to connect or disconnect the second end 101*b* and the ground point 40. The operating frequency coverage area and the directivity pattern coverage area of the printed antenna 10 may be further expanded by disposing the switch component 103*d* and controlling on-off of the switch component 103*d*. The following uses Table 2 to list operating frequencies and directivity pattern modes that can be covered by the printed antenna shown in FIG. 7.

TABLE 2

| Switch Component 103a | Switch Component 103b | Switch Component 103c | Directivity Pattern Mode | Operating Frequency/ GHz |
|---|---|---|---|---|
| 0 | 0 | 0 | Left directional | 5.0-6.0 |
| 0 | 0 | 1 | Left directional | 4.3-6.4 |
| 0 | 1 | 0 | Horizontal omnidirectional | 4.4-6.2 |
| 0 | 1 | 1 | Vertical coverage | 5.0-6.0 |
| 1 | 0 | 0 | Right directional | 2.4-3.1 |
| 1 | 0 | 1 | Vertical coverage | 6.3-9.7 |
| 1 | 1 | 0 | Vertical coverage | 6.9-8.2 |
| 1 | 1 | 1 | Vertical coverage | 5.0-6.0 |

Optionally, in addition to the foregoing described embodiment in which the loop antenna body is divided into three antenna branches, the loop antenna body may alternatively be divided into more antenna branches. The following describes an embodiment in which the loop antenna body is divided into four antenna branches.

Figure 8:
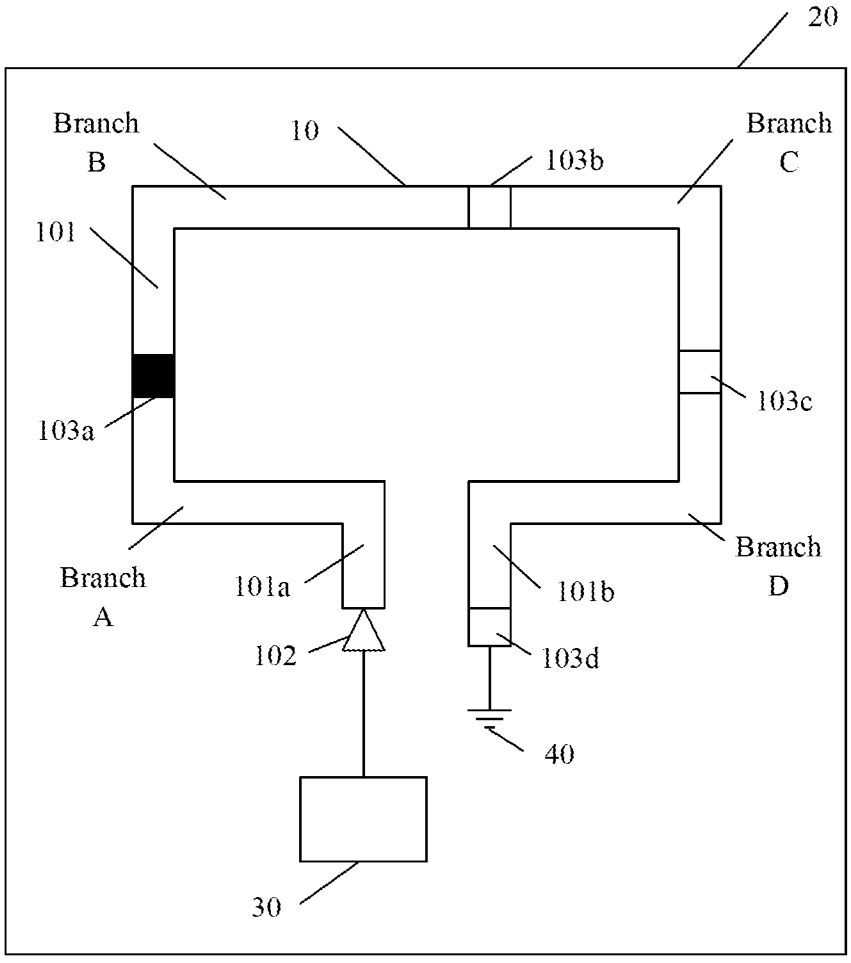
FIG. 8 is a schematic diagram of another structure of a printed antenna according to an embodiment of this disclosure.

FIG. 8 is a schematic diagram of another structure of a printed antenna according to an embodiment of this disclosure. Different from the printed antenna shown in FIG. 7, the loop antenna body 101 further includes a branch D, a switch component 103*c* is disposed between the branch C and the branch D, and the switch component 103*c* is configured to connect or disconnect the branch C and the branch D. Compared with the embodiment shown in FIG. 7, this embodiment further expands the operating frequency coverage area and the directivity pattern coverage area of the printed antenna 10. The following uses Table 3 to list operating frequencies and directivity pattern modes that can be covered by the printed antenna shown in FIG. 8.

TABLE 3

| Switch Component 103a | Switch Component 103b | Switch Component 103c | Switch Component 103d | Operating Frequency/GHz | Directivity Pattern Mode |
|---|---|---|---|---|---|
| 0 | 0 | 0 | 0 | 5G-6G | Horizontal omnidirectional |
| 0 | 0 | 0 | 1 | 5G-6G | Horizontal omnidirectional |
| 0 | 0 | 1 | 0 | 5G-6G | Left directional |
| 0 | 0 | 1 | 1 | 5G-6G | Left directional |
| 0 | 1 | 0 | 0 | 5G-6G | Horizontal omnidirectional |
| 0 | 1 | 0 | 1 | 5G-6G | Vertical coverage |
| 0 | 1 | 1 | 0 | 5G-6G | Horizontal omnidirectional |
| 0 | 1 | 1 | 1 | 5G-6G | Horizontal omnidirectional |
| 1 | 0 | 0 | 0 | 2.3-3.3G | Horizontal omnidirectional |
| 1 | 0 | 0 | 1 | 2.3-3.3G | Horizontal omnidirectional |
| 1 | 0 | 1 | 0 | 2.2-3.1G | Horizontal omnidirectional |
| 1 | 0 | 1 | 1 | 6.4-10.9G | Vertical coverage |
| 1 | 1 | 0 | 0 | 1.6-2.2G | Horizontal omnidirectional |
| 1 | 1 | 0 | 1 | 1.7-2.1G | Horizontal omnidirectional |
| 1 | 1 | 1 | 0 | 6.9-8.7G | Horizontal omnidirectional |
| 1 | 1 | 1 | 1 | 5G-6G | Vertical coverage |

It should be noted that a quantity of antenna branches obtained by dividing the loop antenna body and a quantity of switch components are subject to an actual requirement, and are not specifically limited herein. In addition, a placement position of the switch component may be determined in a plurality of manners. The following uses the printed antenna shown in FIG. 8 as an example to describe a specific implementation of determining the placement position of the switch component.

Figure 9:
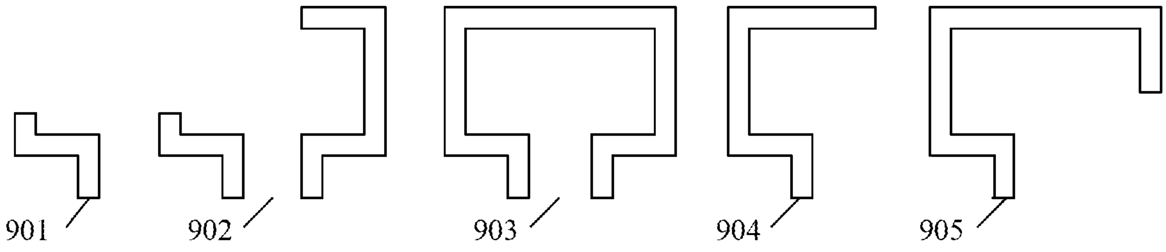
FIG. 9 is a schematic diagram of an antenna with a single radiation mode.

Step 1: Design antennas with a plurality of operating frequencies and whose directivity patterns are single radiation modes. FIG. 9 is a schematic diagram of an antenna with a single radiation mode. It can be seen that different constituent parts in the loop antenna body may form antennas of different modes. An antenna 901 is a monopole antenna whose operating frequency is 5 GHz and whose directivity pattern mode is horizontal omnidirectional. An antenna 902 is an antenna whose operating frequency is 5 GHz and whose directivity pattern mode is left directional. An antenna 903 is an antenna whose operating frequency is 5 GHz and whose directivity pattern mode is vertical coverage. An antenna 904 is a monopole antenna whose operating frequency is 2.4 GHz and whose directivity pattern mode is horizontal omnidirectional. An antenna 905 is a monopole antenna whose operating frequency is 1.6 GHz to 2.2 GHz and whose directivity pattern mode is horizontal omnidirectional.

Figure 10:
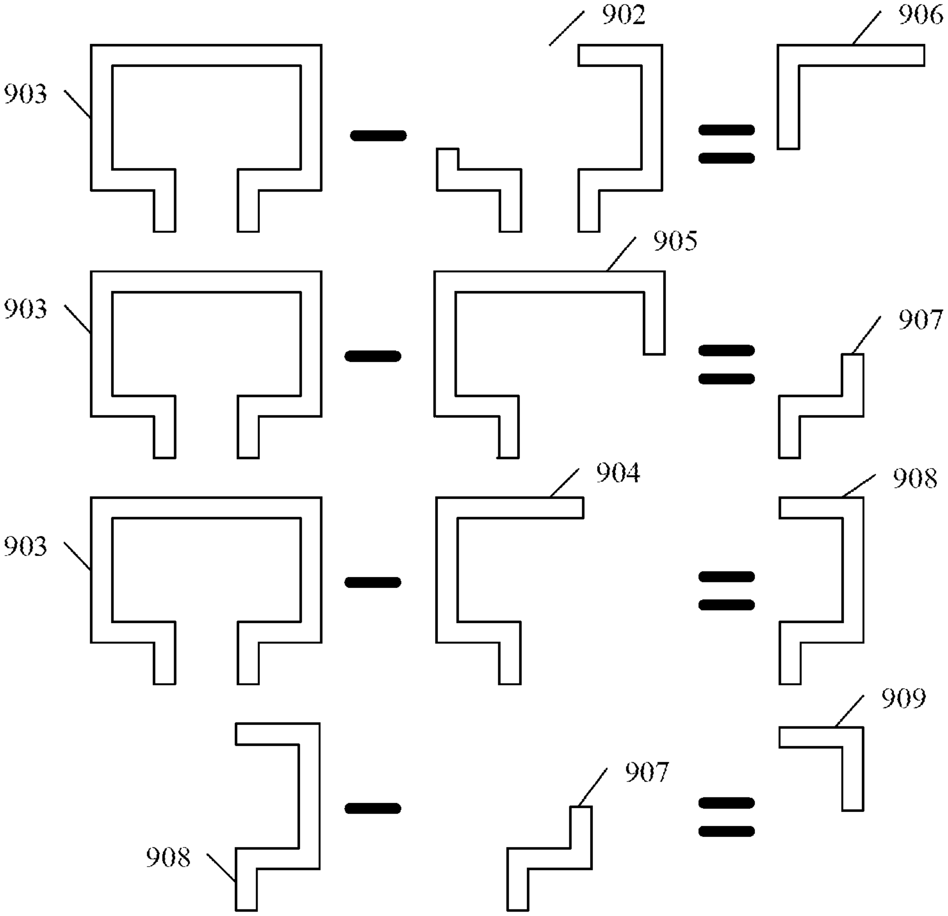
FIG. 10 is a schematic diagram of segmenting an antenna with a single radiation mode.

Step 2: Segment the antennas with single radiation modes by using the loop antenna body as a complete antenna, to obtain a plurality of antenna branches that do not overlap each other. FIG. 10 is a schematic diagram of segmenting an antenna with a single radiation mode. It can be seen that the antenna 903 corresponds to the loop antenna body 101, and the antenna 901 corresponds to the branch A shown in FIG. 8. An antenna 906 may be obtained by splitting the antenna 903 by using the antenna 902, and the antenna 906 corresponds to the branch B shown in FIG. 8. An antenna 907 may be obtained by splitting the antenna 903 by using the antenna 905, and the antenna 907 corresponds to the branch D shown in FIG. 8. An antenna 908 may be obtained by splitting the antenna 903 by using the antenna 904, an antenna 909 may be obtained by further splitting the antenna 908 by using the antenna 907, and the antenna 909 corresponds to the branch C shown in FIG. 8.

Step 3: Determine the position of the switch component based on the antenna branches. Specifically, the loop antenna body may be divided into the branch A, the branch B, the branch C, and the branch D by performing step 1 and step 2. In this case, a position between every two adjacent branches is a position at which each switch component is disposed. In addition, a switch component may also be disposed between the branch D and the ground point.

It should be noted that an operating frequency band of the printed antenna covers an operating frequency band (including 2.4 GHz and 5 GHz) of a wireless local area network (WLAN) standard and an operating frequency band (including 1.6 GHz to 2.2 GHz and 2.3 GHz to 2.7 GHz) of a long term evolution (LTE) standard. In addition, the printed antenna provided in this disclosure is not limited to a WLAN frequency band and an LTE frequency band. A size of the printed antenna, a quantity of antenna branches, and a division manner may be adjusted to meet more application requirements.

In the embodiments of this disclosure, the loop antenna body includes a plurality of loop antenna branches, and the switch component is disposed between every two adjacent loop antenna branches. Each switch component may connect or disconnect two adjacent loop antenna branches. The operating frequency of the loop antenna changes in two different statuses in which the switch component is turned on or off. Therefore, a plurality of operating frequencies and directivity patterns may be covered by adjusting turn-on or turn-off of each switch component, thereby expanding the operating frequency and the directivity pattern coverage mode that can be selected by the antenna.

It should be noted that the foregoing embodiments are merely intended to describe the technical solutions of this disclosure other than to limit this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A printed antenna, wherein the printed antenna is printed on a substrate, a feed module is further disposed on the substrate, and the printed antenna comprises a loop antenna body, a feed port, and at least one switch component;

the loop antenna body comprises a first end and a second end, there is a spacing between the first end and the second end, a connection line between the first end and the second end forms a closed loop with the loop antenna body, the first end is configured to be connected to the feed module through the feed port, and the second end is configured to be connected to a ground point (GND);

the feed module is configured to output a feed signal to the loop antenna body through the feed port;

the loop antenna body comprises a plurality of loop antenna branches, the switch component is disposed between every two adjacent loop antenna branches, and the switch component is configured to connect or disconnect the two adjacent loop antenna branches; and the printed antenna further comprises a first reflector antenna body, the first reflector antenna body is disposed on one side of the loop antenna body, and the first reflector antenna body is connected to the feed module, and the first reflector antenna body comprises two first reflector antenna branches, a second switch component is disposed between the two first reflector antenna branches, and the second switch component located between the two first reflector antenna branches is configured to connect or disconnect the two first reflector antenna branches.

2. The printed antenna according to claim 1, wherein the switch component is a 0-ohm resistor; and one end of the 0-ohm resistor is connected to one of the two adjacent loop antenna branches, and the other end of the 0-ohm resistor is connected to the other one of the two adjacent loop antenna branches; or the one end of the 0-ohm resistor is connected to one of the two adjacent loop antenna branches, and the other end of the 0-ohm resistor is disconnected from the other one of the two adjacent loop antenna branches; or the one end of the 0-ohm resistor is disconnected from one of the two adjacent loop antenna branches, and the other end of the 0-ohm resistor is disconnected from the other one of the two adjacent loop antenna branches.

3. The printed antenna according to claim 1, wherein a control module is further disposed on the substrate, the switch component is a diode, and the control module is connected to the diode;

one end of the diode is connected to one of the two adjacent loop antenna branches, and the other end of the diode is connected to the other one of the two adjacent loop antenna branches; and the control module is configured to control the diode to be turned on or off.

4. The printed antenna according to claim 1, wherein the printed antenna further comprises a second reflector antenna body, the second reflector antenna body is disposed on the other side of the loop antenna body, and the second reflector antenna body is connected to the feed module; and the second reflector antenna body comprises two second reflector antenna branches, third switch component is disposed between the two second reflector antenna branches, and the third switch component located between the two second reflector antenna branches is configured to connect or disconnect the two second reflector antenna branches.

5. The printed antenna according to claim 1, wherein another switch component is disposed between the second end and the GND, and the another switch component located between the second end and the GND is configured to connect or disconnect the second end and the GND.

6. The printed antenna according to claim 1, wherein the at least one switch component of the printed antenna comprises a plurality of switch parts including a first switch part, a second switch part, a third switch part, and a fourth switch part; the plurality of loop antenna branches of the loop antenna body comprises a first loop antenna branch, a second loop antenna branch, a third loop antenna branch, and a fourth loop antenna branch; one end of the first loop antenna branch is connected to the feed module through the feed port, and the first switch part is disposed between the other end of the first loop antenna branch and the second loop antenna branch; and the second switch part is disposed between the second loop antenna branch and the third loop antenna branch, the third switch part is disposed between the third loop antenna branch and one end of the fourth loop antenna branch, and the fourth switch part is disposed between the other end of the fourth loop antenna branch and the GND.

7. The printed antenna according to claim 6, wherein the first loop antenna branch is a monopole antenna.

8. The printed antenna according to claim 6, wherein an operating frequency band of the printed antenna comprises an operating frequency band of a wireless local area network WLAN standard and an operating frequency band of a long term evolution LTE standard; and radiation directions of the printed antenna comprise horizontal omnidirectional, horizontal directional, and vertical coverage.

9. The printed antenna according to claim 1, wherein:

the at least one switch component includes a first switch part and a second switch part;

the plurality of loop antenna branches includes a first loop antenna branch, a second loop antenna branch, and a third loop antenna branch, the first loop antenna branch is adjacent to the second loop antenna branch, and the second loop antenna branch is adjacent to the third loop antenna;

the first switch part is positioned between the first and second loop antenna branches, and the second switch part is positioned between the second and third loop antenna branches.

10. The printed antenna according to claim 9, wherein:

each of the first and second switch parts is a 0-ohm resistor.

11. The printed antenna according to claim 9, wherein:

each of the first and second switch parts includes a diode.

12. A printed antenna, wherein the printed antenna is printed on a substrate, a feed module is further disposed on the substrate, and the printed antenna comprises a loop antenna body, a feed port, and at least one switch component;

the loop antenna body comprises a first end and a second end, there is a spacing between the first end and the second end, a connection line between the first end and the second end forms a closed loop with the loop antenna body, the first end is configured to be connected to the feed module through the feed port, and the second end is configured to be connected a ground point (GND), the feed module is configured to output a feed signal to the loop antenna body through the feed port;

the loop antenna body comprises a plurality of loop antenna branches, the switch component is disposed between every two adjacent loop antenna branches, and the switch component is configured to connect or disconnect the two adjacent loop antenna branches;

the at least one switch component includes a first switch component and a second switch component, the plurality of loop antenna branches includes a first loop antenna branch, a second loop antenna branch, and a third loop antenna branch, the first loop antenna branch is adjacent to the second loop antenna branch, and the second loop antenna branch is adjacent to the third loop antenna;

the first switch component is positioned between the first and second loop antenna branches, and the second switch component is positioned between the second and third loop antenna branches; and the printed antenna further comprises a first reflector antenna body having a first reflector antenna branch, a second reflector antenna branch, and a third switch component positioned between the first and second reflector antenna branches.

13. The printed antenna according to claim 12, wherein the printed antenna further comprises a second reflector antenna body having a third reflector antenna branch, a fourth reflector antenna branch, and a fourth switch component positioned between the third and fourth reflector antenna branches.

14. The printed antenna according to claim 13, wherein the first and second reflector antenna bodies are respectively positioned on opposite sides of the loop antenna body.

* * * * *